Jan. 5, 1960            L. F. PEASE            2,919,810
MOUNTING ATTACHMENT FOR CHRISTMAS TREE LIGHTS
Filed Dec. 11, 1957            2 Sheets-Sheet 1
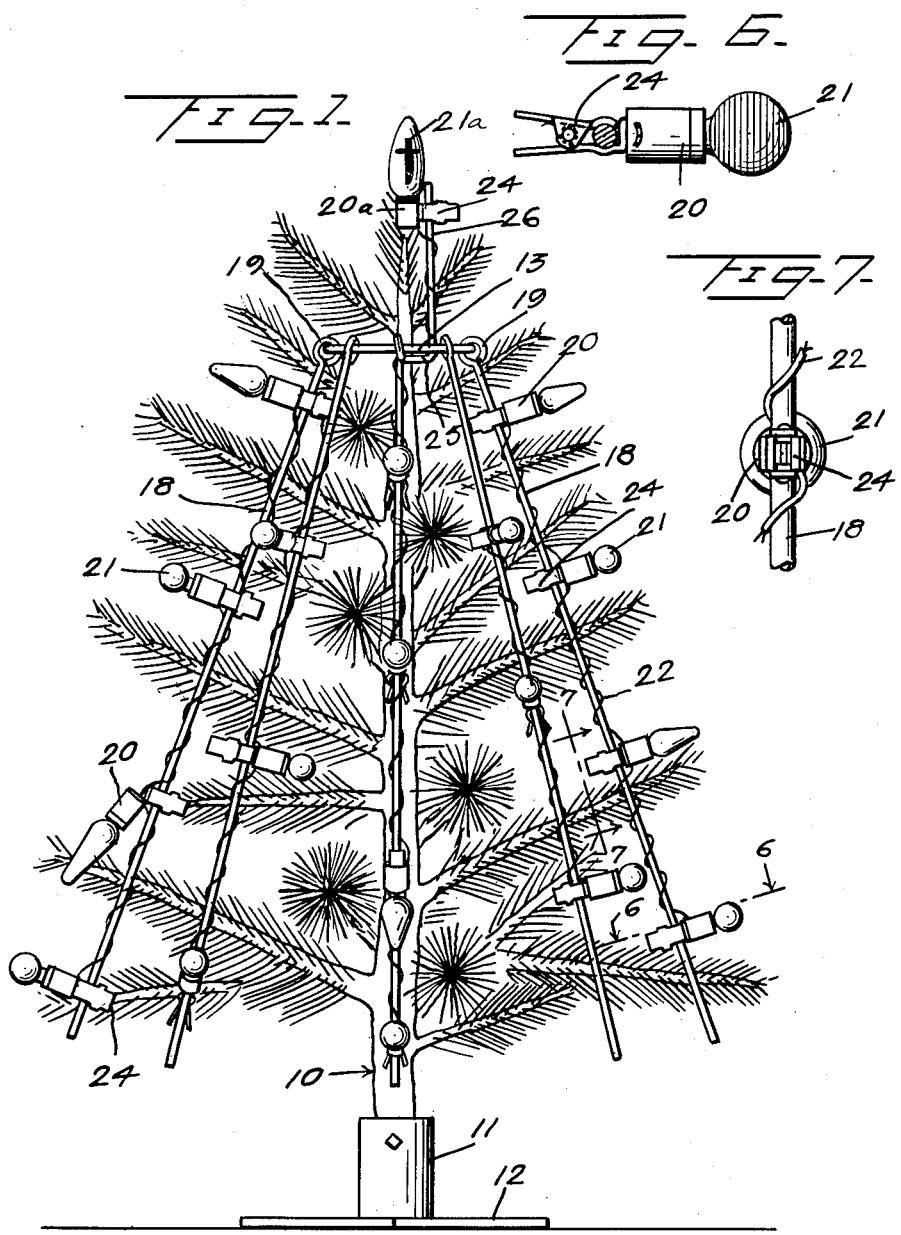
L. F. Pease
INVENTOR
BY C. A. Snow & Co.
ATTORNEYS.

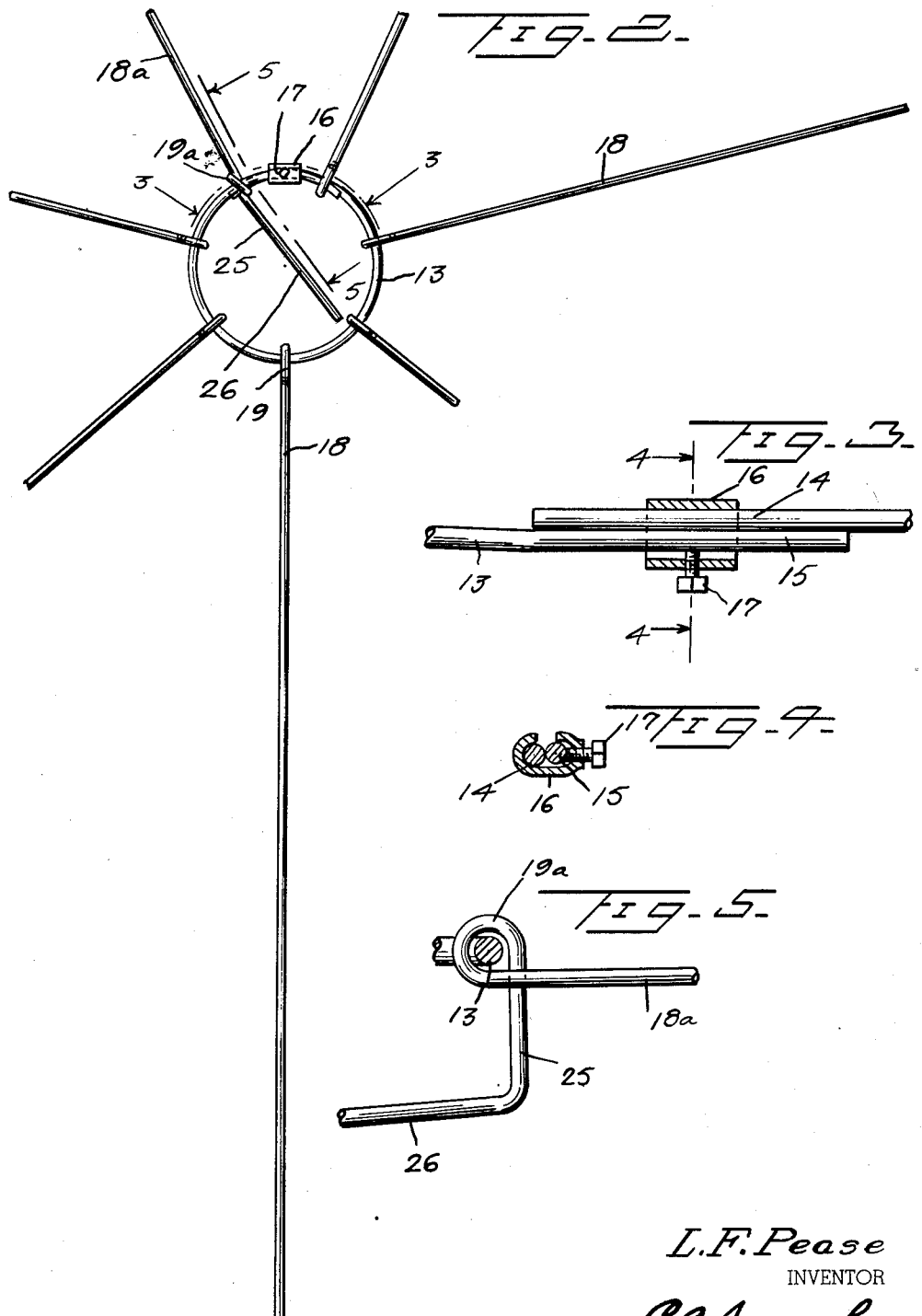

United States Patent Office 2,919,810
Patented Jan. 5, 1960

2,919,810

MOUNTING ATTACHMENT FOR CHRISTMAS TREE LIGHTS

Lyle F. Pease, Indiana, Pa.

Application December 11, 1957, Serial No. 702,106

1 Claim. (Cl. 211—26)

This invention relates to a mounting attachment for Christmas tree lights or similar ornamentation for decorative purposes, and has as its primary object the provision of an improved mounting structure whereby Christmas tree lights or the like may be quickly and expeditiously mounted on a Christmas tree with a minimum of time and effort and expense.

An additional object of the invention is the provision of such an attachment adapted for the reception and mounting of one or more conventional strings of Christmas tree lights so arranged that an entire string or plurality of strings may be simultaneously positioned on or removed from a Christmas tree to be decorated.

An additional object of the invention is the provision of such a device incorporating a mounting ring, and a plurality of swivelly mounted rods, to which are adapted to be attached lights or strings of lights, or other ornamentation, the rods being preferably constructed of flexible nonresilient material, so that if desired they may be suitably bent in accordance with the contour of the tree being decorated.

An additional object of the invention is the provision of a device of this character which may be readily stored in a small space when not in use.

Still another object of the invention is the provision of a device of this character, which is sturdy and durable in construction, reliable and efficient in operation, relatively simple and inexpensive to manufacture and assemble, and particularly easy to mount and dismount.

Still other objects reside in the combination of elements, arrangements of parts, and features of construction, all as will be more fully pointed out hereinafter and disclosed in the accompanying drawings wherein there is shown a preferred embodiment of this inventive concept.

In the drawings:

Figure 1 is a side elevational view of a Christmas tree or the like, having the mounting assembly of the instant invention positioned thereon.

Figure 2 is a top plan view, partially broken away, showing the assembled device prior to mounting, and with the lights disassociated therefrom.

Figure 3 is an enlarged sectional view taken substantially along the line 3—3 of Figure 2 as viewed in the direction indicated by the arrows.

Figure 4 is a sectional view taken substantially along the line 4—4 of Figure 3 as viewed in the direction indicated by the arrows.

Figure 5 is an enlarged sectional view taken substantially along the line 5—5 of Figure 2 as viewed in the direction indicated by the arrows.

Figure 6 is an enlarged sectional view taken substantially along the line 6—6 of Figure 1 as viewed in the direction indicated by the arrows.

Figure 7 is an enlarged sectional view taken substantially along the line 7—7 of Figure 1 as viewed in the direction indicated by the arrows.

Similar reference characters refer to similar parts throughout the several views of the drawings.

Having reference now to the drawings in detail, there is generally indicated at 10 a Christmas tree or similar article to be decorated, which may be of any desired size, and which may be either natural or artificial, and either decorated with additional ornamentation, or undecorated as desired. The tree 10 may be mounted by any conventional means, such as for example, a socket 11 carried by a base 12.

The device of the instant invention comprises a ring 13, of any desired diameter, in accordance with the size of the tree to be decorated, and constructed of any desired material. The ring may be either in one piece, and adapted to be slipped over the top of the tree, and held in position by the upper branches, or may, as best shown in Figures 2, 3 and 4 be comprised of a circular element having separate ends, 14 and 15 which are secured together in any desired manner, as for example by means of a C-shaped clamp 16, holding the two ends 14 and 15 in parallel clamped relation, the ends being secured as by means of the set screw 17 or the like. By means of this construction the wire 13 may be positioned about the tree either adjacent the top, as shown in Figure 1, or at any intermediate point where desired.

A plurality of rods 18 each provided at one extremity with a loop 19 are adapted to be swivelly mounted on the ring 13, as best shown in Figures 1 and 2, and may be suitably positioned about the periphery of the ring 13, in accordance with the contour of the tree. The rods 18 may be of any desired length, in accordance with the desires of the manufacturer, and are preferably constructed of suitable flexible material, which is not resilient, such, for example, as aluminum wire, so that, if desired the rods may be bent to conform to the contour of the particular tree being decorated.

Prior to positioning of the ring 13 and the rods 18 on the tree, each of rods 18 has suitably positioned thereon Christmas tree lighting sockets 20, each of which is adapted to contain a Christmas tree light 21. The sockets 20 are connected by the conventional wiring 22, and supplied with current from any desired source. Any desired means may be employed for securing the sockets 20 to the tree, and, when older forms of light cord are employed, such means may take the form of Scotch tape or the like. However most modern strings of lights are equipped with spring clips 24, which in conventional usage are adapted to clamp about the branches of the tree. Such clamps, with the instant invention are clamped about the rods 18, as shown in Figures 6 and 7, and by means of the spring clips the lights may be attached at any desired predetermined intervals along the rods 18.

As best shown in Figures 1, 2 and 5 one of the rods 18a is provided with a looped portion 19a, which instead of terminating at the ring 13 as do the loops 19, continues with an extension 25, which, when the assembly is in position on the tree is horizontal, as shown in Figure 1, and which terminates in an upright portion 26. The upright portion 26 is adapted to extend upwardly to the top of the tree 10, and has clamped thereto by means of a clamp 24, a top socket 20a which contains a bulb 21a, preferably in upright position. The bulb 21a may be of a particular ornamental type adapted for positioning in the top of the tree.

While a particular material, such as aluminum wire has been heretofore described, it will be understood that any desired material may be employed for both the rods and the ring 13, and while they have been defined as straight, they may be curved either in the manufacture, or, if constructed of suitable material after positioning on the tree.

From the foregoing it will now be seen that there is herein provided a device to which Christmas tree lights may be attached prior to mounting on a Christmas tree, and by means of which a Christmas tree may be supplied substantially completely with a desired lighting arrangement at a single operation, thus eliminating the tedious and time consuming task of connecting each individual light or light string to a branch or the like as hitherto has been the case.

As many embodiments may be made of this inventive concept, and as many modifications may be made in the embodiments hereinbefore shown and described, it is to be understood that all matter herein is to be interpreted merely as illustrative, and not in a limiting sense.

I claim:

In a device of the character described, in combination, a supporting ring adapted to be mounted about the trunk of a Christmas tree adjacent to an upper portion thereof, a plurality of rigid supporting rods having loops at one of their respective ends, said loops being loosely swivelled on said ring for lateral tilting movement, said rods depending from said ring, strings of Christmas tree light sockets including clamps removably clamped to said rods, an extension forming a part of one of said rods extending upwardly from said ring terminating adjacent to the top of the tree forming a support for a light socket located at the top of the tree.

References Cited in the file of this patent

UNITED STATES PATENTS

| | | |
|---|---|---|
| 531,815 | Wade | Jan. 1, 1895 |
| 542,556 | Drum | July 9, 1895 |
| 2,309,977 | Peroni | Feb. 2, 1943 |
| 2,453,695 | Belling | Nov. 16, 1948 |

FOREIGN PATENTS

| | | |
|---|---|---|
| 997,036 | France | Sept. 5, 1951 |